US012773916B2

(12) United States Patent
Naganishi et al.

(10) Patent No.: US 12,773,916 B2
(45) Date of Patent: Oct. 27, 2026

(54) VEHICLE CHARGING SYSTEM

(71) Applicants: YAZAKI CORPORATION, Tokyo (JP); ShinMaywa Industries, Ltd., Takarazuka (JP)

(72) Inventors: Yukinari Naganishi, Susono (JP); Koji Ikegaya, Susono (JP); Takashi Shiroki, Susono (JP); Hajime Ojiro, Takarazuka (JP); Masahiro Namba, Takarazuka (JP)

(73) Assignees: YAZAKI CORPORATION, Tokyo (JP); ShinMaywa Industries, Ltd., Hyogo (JP)

( * ) Notice: Subject to any disclaimer, the term of this patent is extended or adjusted under 35 U.S.C. 154(b) by 749 days.

(21) Appl. No.: 18/352,173

(22) Filed: Jul. 13, 2023

(65) Prior Publication Data

US 2024/0025281 A1 Jan. 25, 2024

(30) Foreign Application Priority Data

Jul. 21, 2022 (JP) ................................ 2022-116776

(51) Int. Cl.
*B60L 53/16* (2019.01)
*B60L 53/35* (2019.01)

(52) U.S. Cl.
CPC ............... *B60L 53/16* (2019.02); *B60L 53/35* (2019.02)

(58) Field of Classification Search
CPC ................................ B60L 53/16; B60L 53/35
See application file for complete search history.

(56) References Cited

U.S. PATENT DOCUMENTS

| | | | | |
|---|---|---|---|---|
| 10,538,172 | B2 * | 1/2020 | Kauffmann ........ | H01R 13/5202 |
| 11,634,046 | B2 | 4/2023 | Naganishi et al. | |
| 11,679,687 | B2 * | 6/2023 | Choi ........................ | B08B 1/12 320/109 |
| 2017/0129345 | A1 | 5/2017 | Wechsler et al. | |

FOREIGN PATENT DOCUMENTS

| | | | |
|---|---|---|---|
| AU | 2012258299 | * | 12/2012 |
| CN | 105128686 | A | 12/2015 |
| CN | 106233573 | A | 12/2016 |
| CN | 113165544 | * | 7/2021 |
| ES | 2906150 | * | 4/2022 |
| JP | 2014117058 | A | 6/2014 |
| JP | 2022-26379 | A | 2/2022 |

* cited by examiner

*Primary Examiner* — Richard V Muralidar
(74) *Attorney, Agent, or Firm* — KENEALY VAIDYA LLP

(57) ABSTRACT

A vehicle charging system includes a main body fixed to a floor part of a vehicle stop space, a slide body slidable in a first direction relative to the main body, a connector unit including arms and a connector to be connected to the vehicle to charge, a first cover that covers the arms from a side of the main body while pivoting in conjunction with pivoting of the arms, a second cover supported by the slide body and disposed on a side opposite to the side of the main body, and third covers supported by the slide body and disposed on both sides of the connector unit in a second direction orthogonal to the first direction. When the arms are erected, the second cover and the third covers extend upward in conjunction with the pivoting of the arms, thereby forming a frame that surrounds the arms.

6 Claims, 10 Drawing Sheets

VEHICLE CHARGING SYSTEM

CROSS-REFERENCE TO RELATED APPLICATION(S)

The present application claims priority to and incorporates by reference the entire contents of Japanese Patent Application No. 2022-116776 filed in Japan on Jul. 21, 2022.

BACKGROUND OF THE INVENTION

1. Field of the Invention

The present invention relates to a vehicle charging system.

2. Description of the Related Art

Vehicle charging systems have been used conventionally. A vehicle charging system according to Japanese Patent Application Laid-open No. 2022-26379 includes a power supply device including a power supply fitting body and installed in a vehicle stop space. A lift housing of the power supply device is embedded in the vehicle stop space and houses the power supply fitting body.

In a case where the vehicle charging system is disposed on a floor part of the vehicle stop space, a housing space that houses equipment is open at the time of charging of a vehicle. It is desirable to be able to protect the equipment by preventing the entry of foreign matters into the housing space during the charging.

SUMMARY OF THE INVENTION

It is an object of the present invention to provide a vehicle charging system that can prevent the entry of foreign matters into a housing space that houses equipment.

In order to achieve the above mentioned object, a vehicle charging system according to one aspect of the present invention includes a main body fixed to a floor part of a vehicle stop space where a vehicle stops; a slide body that is slidable in a first direction relative to the main body; a connector unit including an arm and a connector to be connected to the vehicle to charge, a base end part of the arm being pivotally supported by the slide body and a tip end part of the arm supporting the connector; a first cover that covers the connector unit from above with the slide body housed in the main body, and covers the arm from a side of the main body while pivoting in conjunction with pivoting of the arm when the arm is erected; a second cover that is supported by the slide body and disposed on a side opposite to the side of the main body with respect to the connector unit; and third covers that are supported by the slide body and disposed on both sides of the connector unit in a second direction orthogonal to the first direction, wherein when the arm is erected, the second cover and the third covers extend upward in conjunction with the pivoting of the arm, thereby forming a frame that surrounds the arm.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A vehicle charging system according to an embodiment of the present invention is hereinafter described in detail with reference to the drawings. The present invention is not limited by this embodiment. The components in the following embodiment include the components that can be easily conceived by those skilled in the art or the components that are substantially the same.

Embodiment

Figure 1:
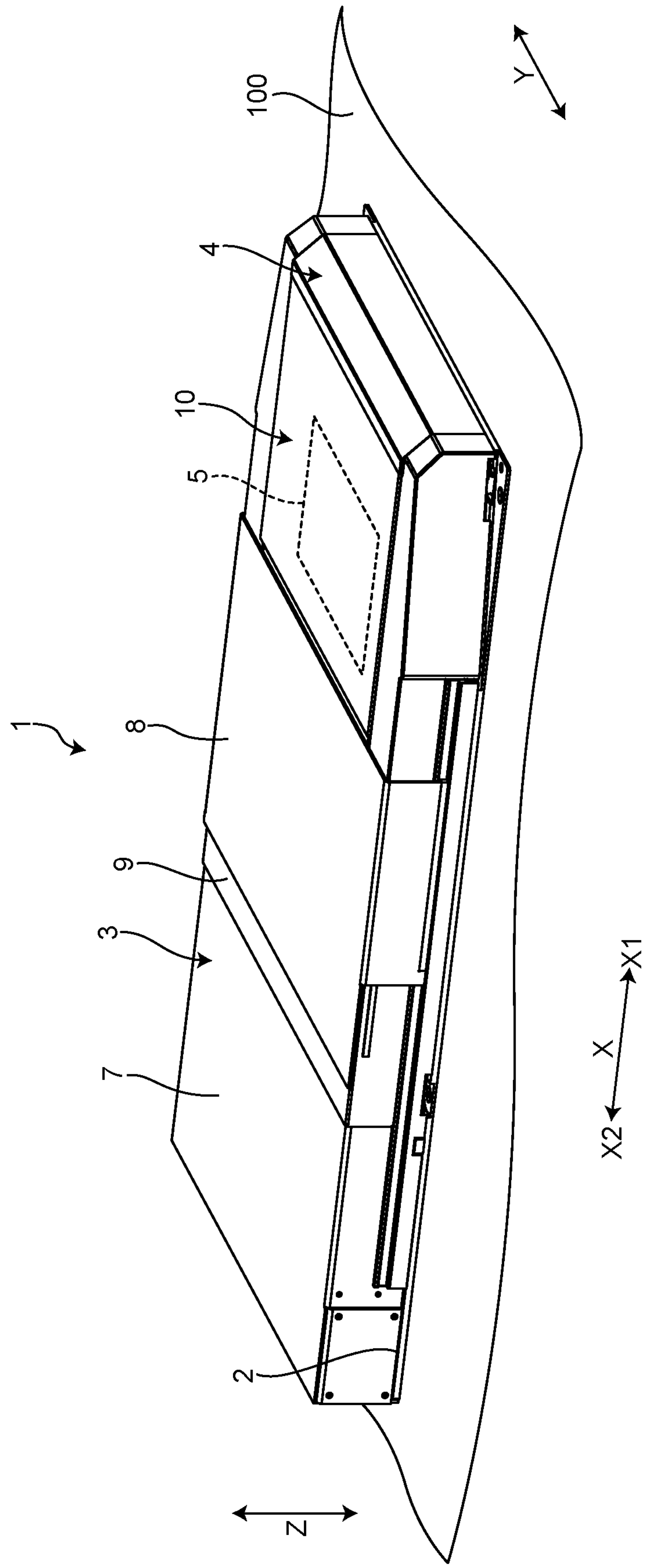
FIG. 1 is a perspective view of a vehicle charging system according to an embodiment.
Figure 2:
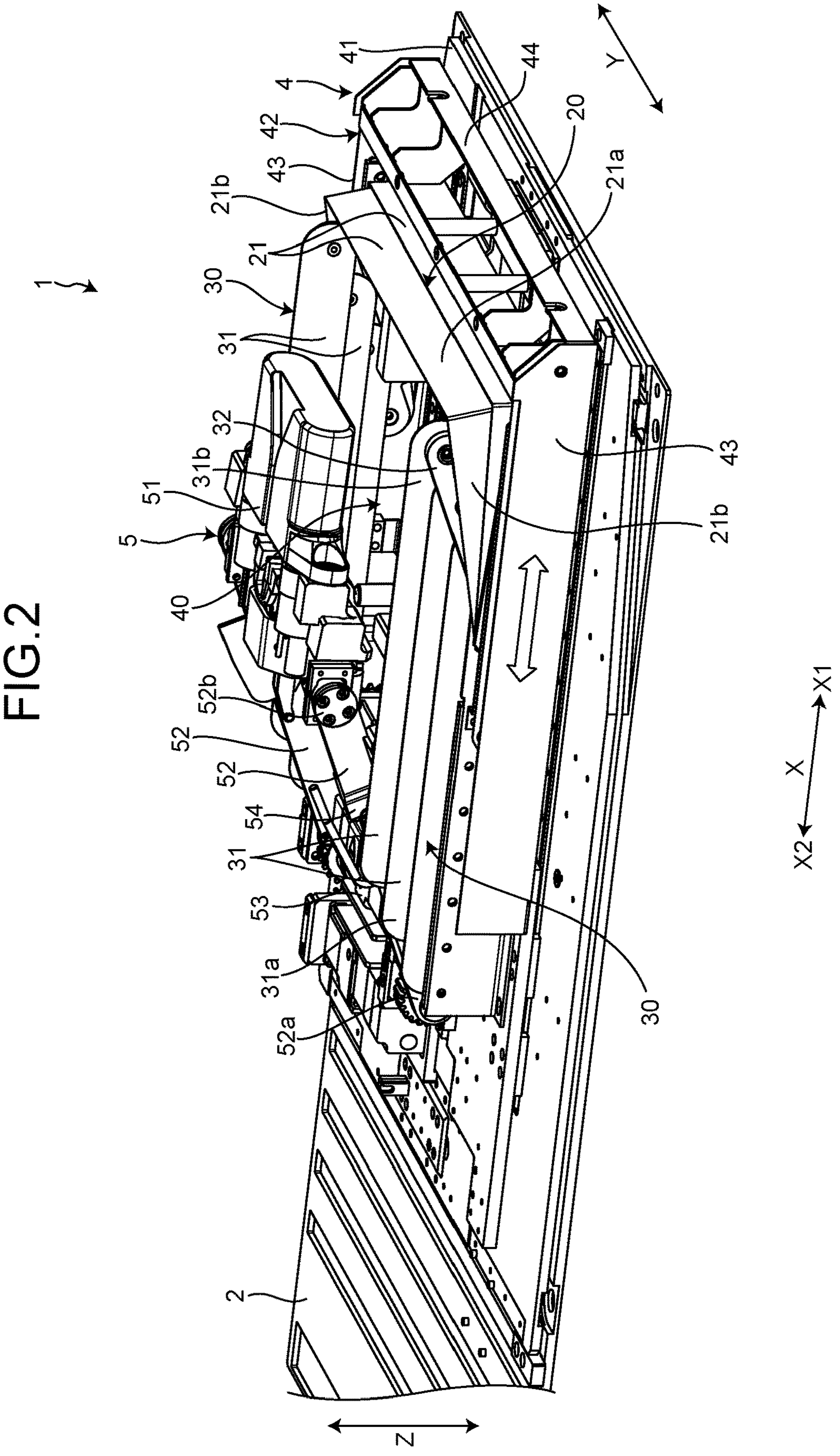
FIG. 2 is a perspective view illustrating an internal structure of the vehicle charging system according to the embodiment.
Figure 3:
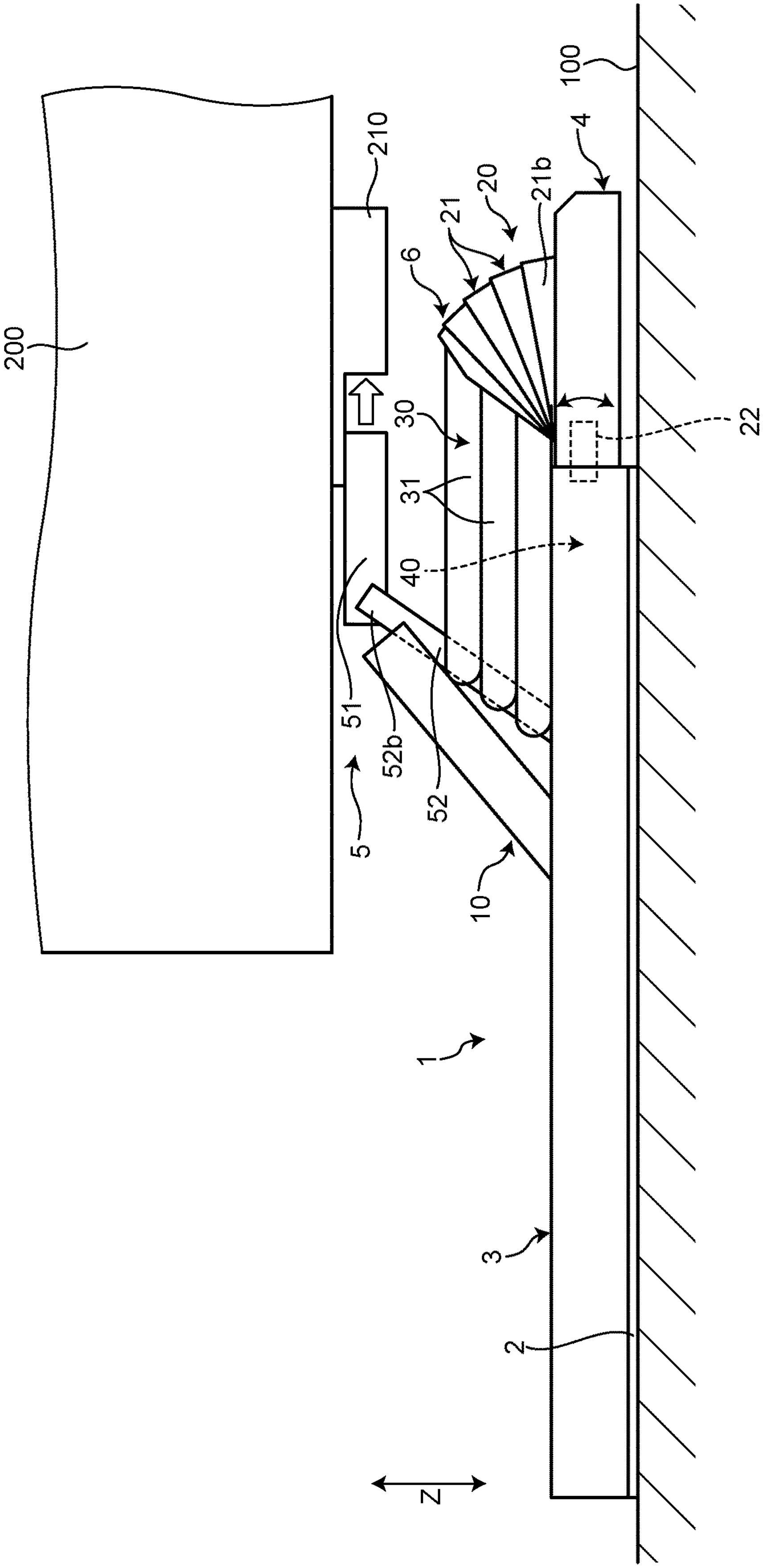
FIG. 3 is a side view of the vehicle charging system according to the embodiment.
Figure 4:
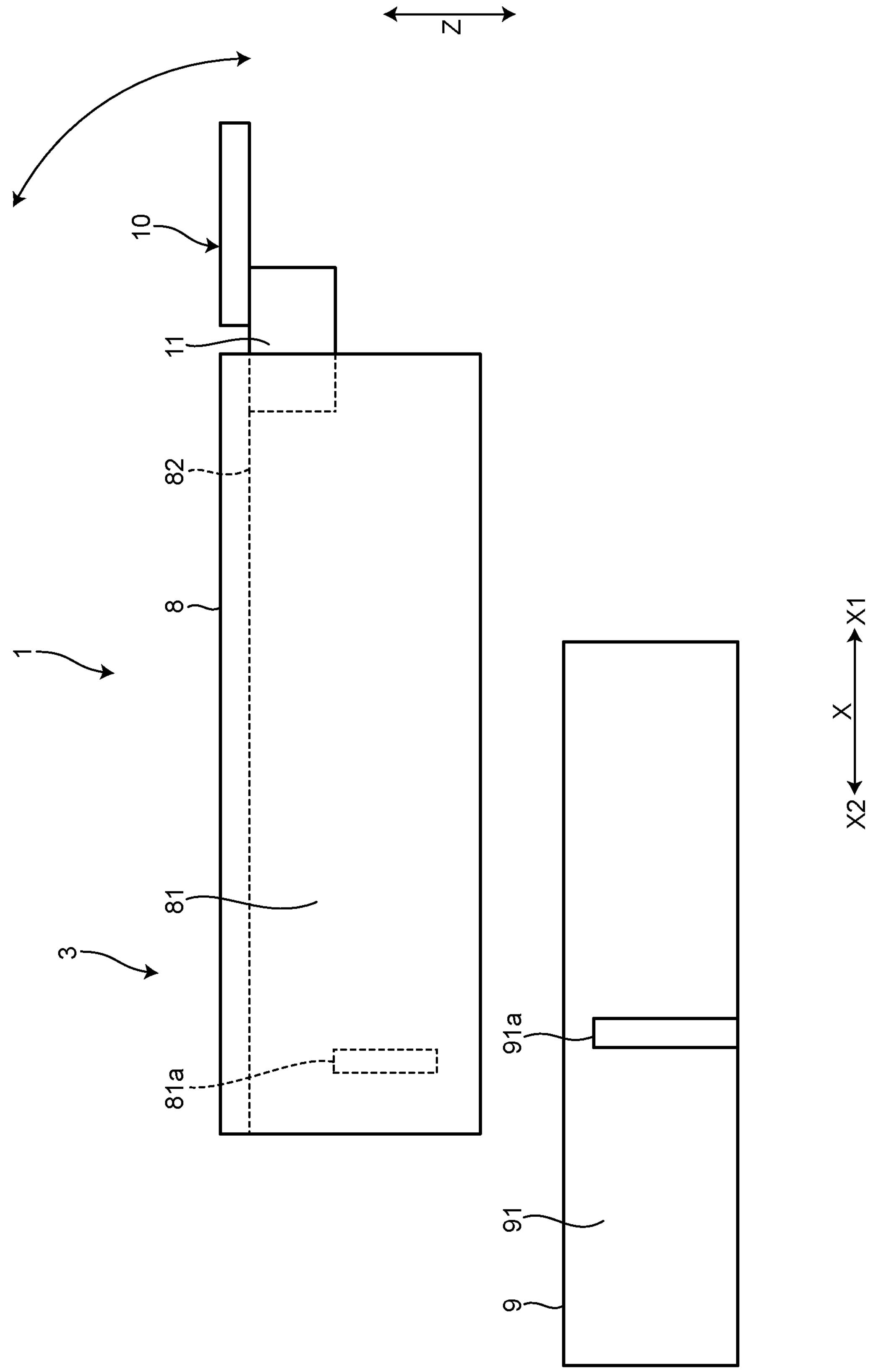
FIG. 4 is an exploded view of a casing according to the embodiment.
Figure 5:
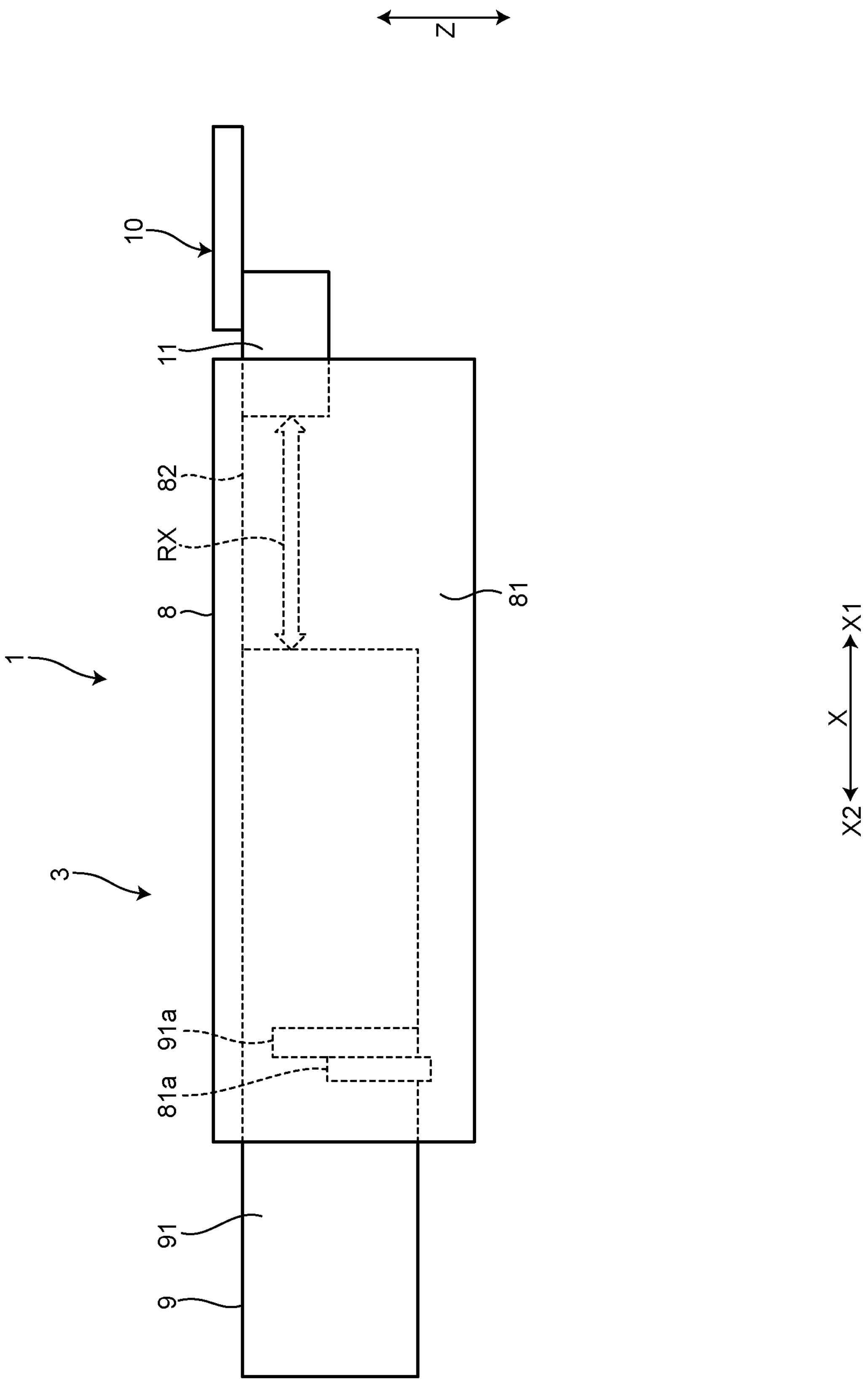
FIG. 5 is a side view of the casing according to the embodiment.
Figure 6:
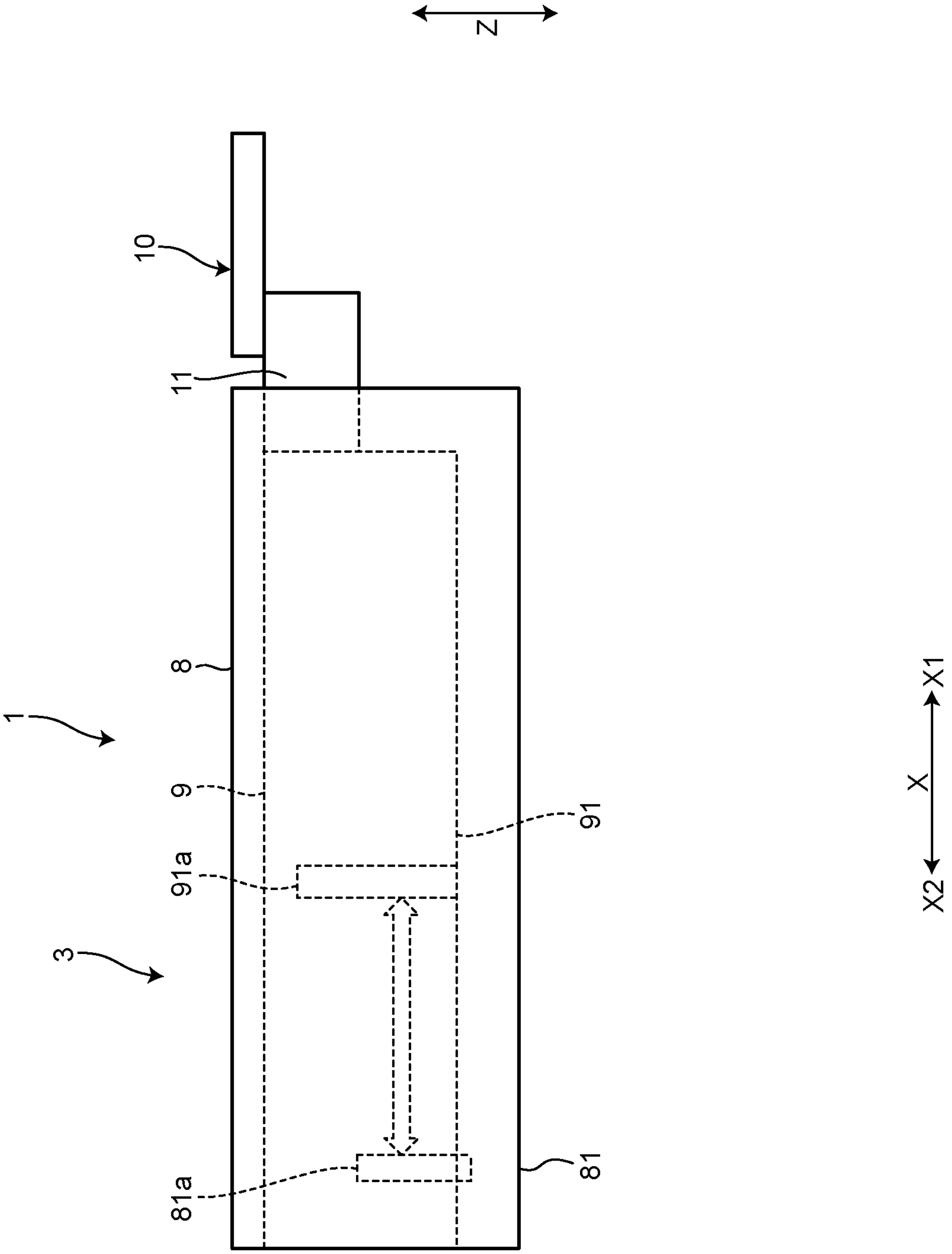
FIG. 6 is a side view of the casing according to the embodiment.
Figure 7:
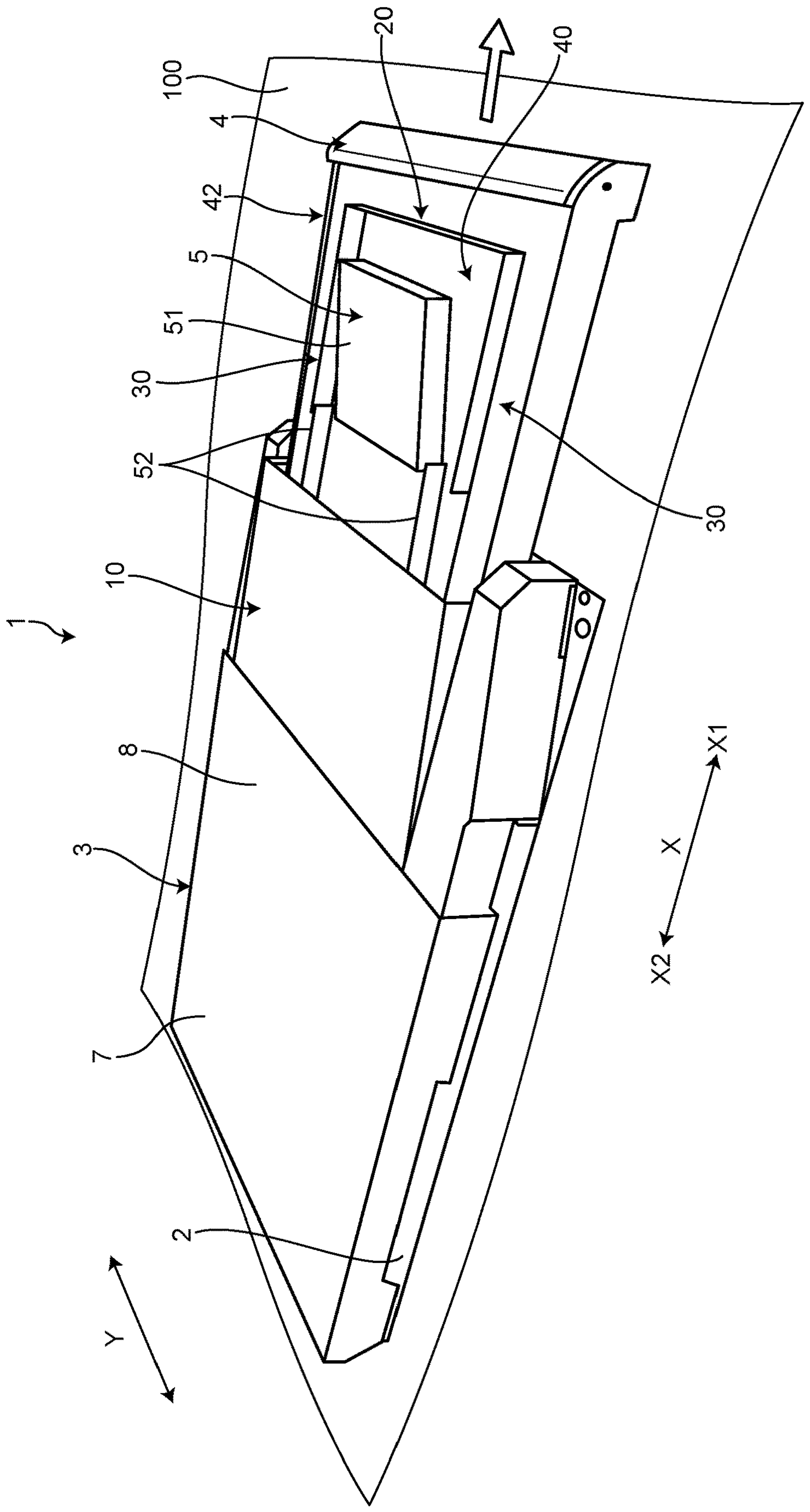
FIG. 7 is a perspective view of the vehicle charging system according to the embodiment.
Figure 8:
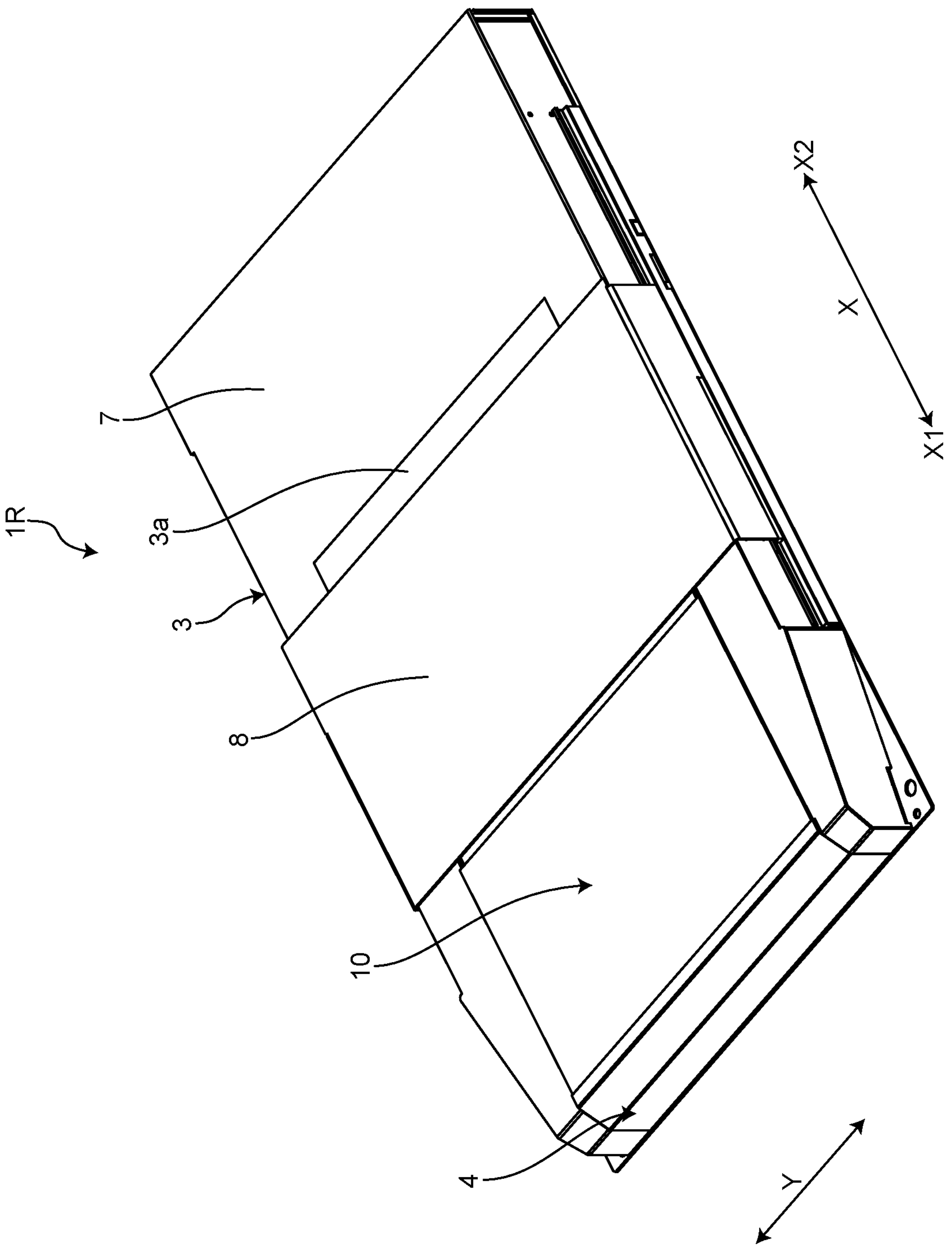
FIG. 8 is a perspective view of a vehicle charging system according to Comparative Example.
Figure 9:
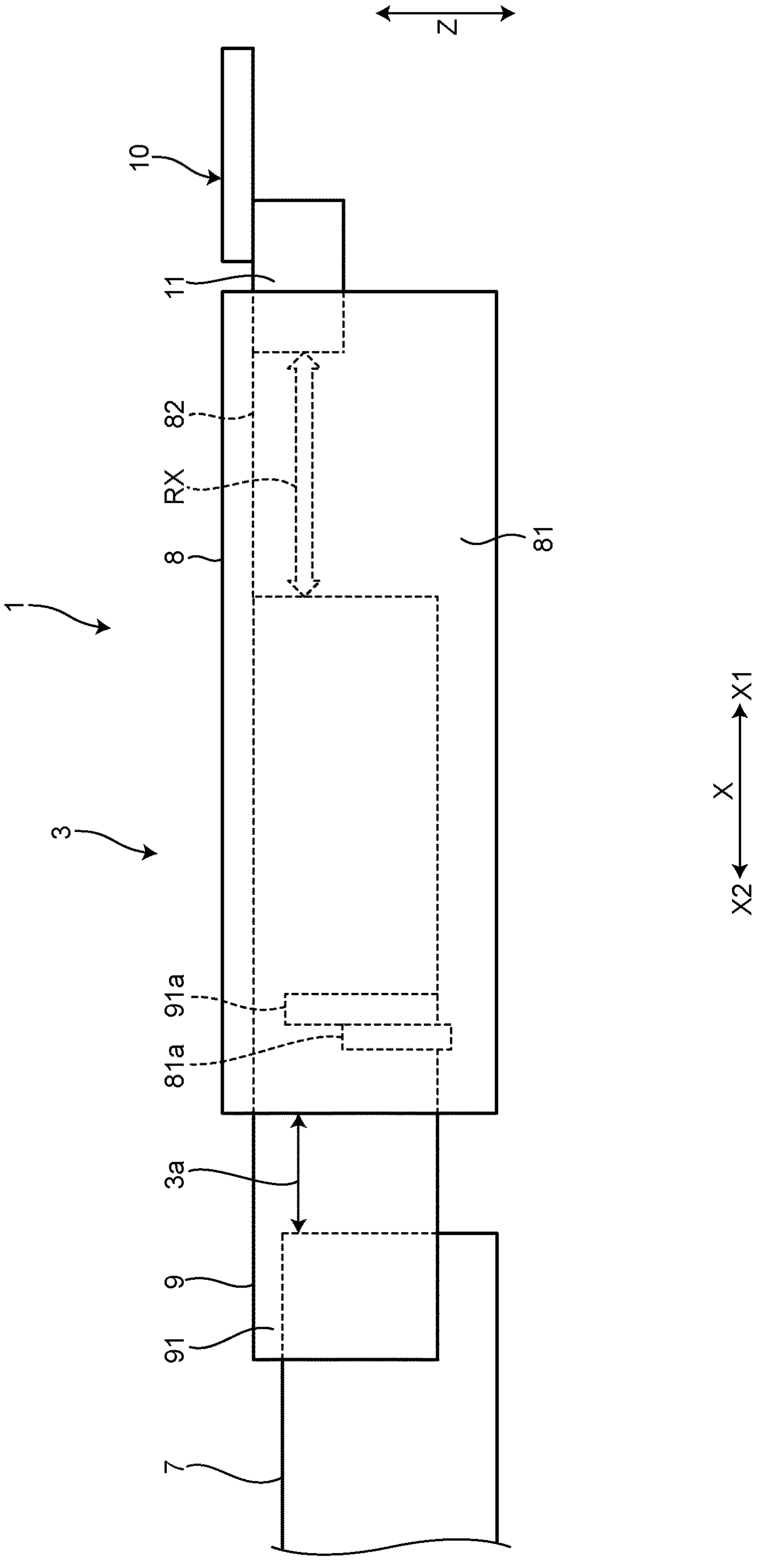
FIG. 9 is a side view of the casing according to the embodiment.
Figure 10:
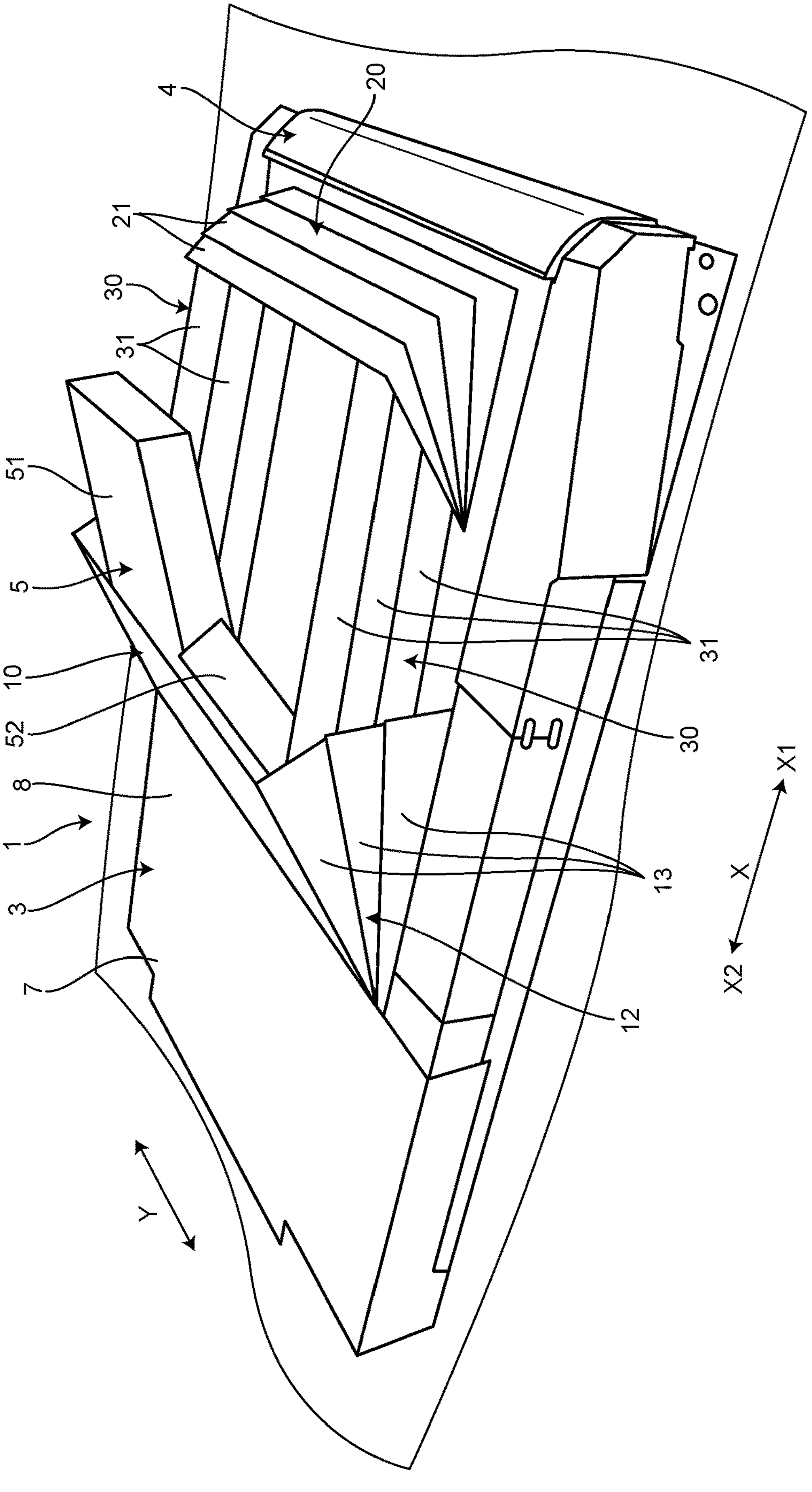
FIG. 10 is a perspective view of the vehicle charging system according to the embodiment.

With reference to FIG. 1 to FIG. 10, one embodiment is described. The present embodiment is related to a vehicle charging system. FIG. 1 is a perspective view of the vehicle charging system according to the embodiment, FIG. 2 is a perspective view illustrating an internal structure of the vehicle charging system according to the embodiment, FIG. 3 is a side view of the vehicle charging system according to the embodiment, FIG. 4 is an exploded view of a casing according to the embodiment, FIG. 5 and FIG. 6 are side views of the casing according to the embodiment, FIG. 7 is a perspective view of the vehicle charging system according to the embodiment, FIG. 8 is a perspective view of a vehicle charging system according to Comparative Example, FIG. 9 is a side view of the casing according to the embodiment, and FIG. 10 is a perspective view of the vehicle charging system according to the embodiment.

As illustrated in FIG. 1, a vehicle charging system 1 according to this embodiment is placed on a floor part 100 of a vehicle stop space where a vehicle stops. As illustrated in FIG. 1 and FIG. 2, the vehicle charging system 1 includes a main body 2, a casing 3, a slide body 4, a connector unit 5, a first cover 10, a second cover 20, and third covers 30.

The main body 2 is a pedestal of the vehicle charging system 1 and is fixed to the floor part 100. The shape of the main body 2 illustrated in the example is a rectangular plate-like shape. The slide body 4 is slidable in a first direction X relative to the main body 2. The first direction X is, for example, a front-rear direction of the vehicle to be charged. The first direction X is a longitudinal direction of the main body 2.

In the following description, the width direction of the main body 2 is referred to as a "second direction Y". The second direction Y is orthogonal to the first direction X. A direction orthogonal to both the first direction X and the second direction Y is referred to as a "third direction Z". The third direction Z is, for example, a vertical direction.

The slide body 4 is supported, for example, by a rail disposed in the main body 2 along the first direction X. As illustrated in FIG. 2, the slide body 4 includes a base part 41 and a frame part 42. The base part 41 is a flat plate-shaped member. The frame part 42 is fixed to an upper surface of the base part 41.

The frame part 42 is disposed so as to surround the connector unit 5 from three sides. More specifically, the frame part 42 includes a pair of opposing walls 43 and a connecting wall 44. The pair of opposing walls 43 extend in the first direction X and face each other in the second direction Y. The connecting wall 44 connects end parts of the pair of opposing walls 43 and extends in the second direction Y. The connecting wall 44 is disposed on the opposite side of the main body 2 with respect to the connector unit 5. The base part 41 and the frame part 42 form a housing space 40 that houses the equipment of the vehicle charging system 1.

In the following description, moving of the slide body 4 away from the main body 2 along the first direction X is referred to as "advance" and moving of the slide body 4 toward the main body 2 is referred to as "retract". However, a front side X1 and a rear side X2 in the advancing and retracting of the slide body 4 may be different from the front and rear sides in the front-rear direction of the vehicle.

The connector unit 5 includes a connector 51 and arms 52. The connector 51 is a fitting body to be connected to the vehicle to charge. The connector 51 includes a plurality of terminals that are connected to terminals on the vehicle side. The illustrated connector unit 5 has two arms 52 disposed on both sides of the second direction Y with respect to the connector 51. The two arms 52 face each other in the second direction Y. A base end part 52*a* of the arm 52 is pivotally supported by the base part 41. The two base end parts 52*a* are connected by a rotary shaft. A tip end part 52*b* of the arm 52 is connected to the connector 51 and supports the connector 51.

A motor 53 as a drive source is located in the base part 41. The motor 53 is connected to the rotary shaft of the arm 52 and enables the arm 52 to pivot. The arms 52, which are driven by the motor 53, rotate with the base end parts 52*a* as a center of rotation so as to move the connector 51 up and down. In the following description, the movement of the arms 52 that move the connector 51 upward is referred to as "erecting". In the case of erecting, the arms 52 rotate in a direction of making the tip end parts 52*b* away from the base part 41.

FIG. 2 illustrates the connector unit 5 with the arms 52 in the process of being erected. The rotational position of the arm 52 illustrated in FIG. 2 is between a tilted position, at which the connector 51 exists the lowest, and an erected position, at which the connector 51 exists the highest. The connector unit 5 is housed in a housing space 40 with the arms 52 in the tilted position.

The first cover 10 pivots in conjunction with the pivoting of the arms 52 when the arms 52 are erected. In FIG. 3, the arms 52 are in the erected state. The first cover 10 may be pushed up by the arms 52 or opened and closed by the torque transmitted from a drive source such as the motor 53. The first cover 10 covers the arms 52 from the side of the main body 2 while pivoting in conjunction with the pivoting of the arms 52. In other words, the first cover 10 covers the erected arms 52 from the rear side X2. As illustrated in FIG. 1, the first cover 10 covers the connector unit 5 from above with the slide body 4 housed in the main body 2.

As illustrated in FIG. 3, the connector 51 is fitted to an inlet 210 of a vehicle 200. The inlet 210 is a power reception fitting body disposed at a lower part of the vehicle body of the vehicle 200. The connector 51 is connected to the battery of the vehicle 200 by being fitted to the inlet 210. The vehicle charging system 1 includes a sensor that detects the inlet 210. A control unit of the vehicle charging system 1 controls the position of the slide body 4, the height position of the connector 51, and the posture of the connector 51 on the basis of the detection result by the sensor.

The vehicle charging system 1 according to this embodiment forms a frame 6 that surrounds the arms 52 when the arms 52 are erected, as illustrated in FIG. 3, etc. The frame 6 includes the second cover 20 and the third covers 30. The frame 6 can protect the components including the connector unit 5 by preventing the entry of foreign matters, etc. into the housing space 40. The second cover 20 and the third covers 30 are configured to extend upward in conjunction with the pivoting of the arms 52 when the arms 52 are erected. The second cover 20 and the third covers 30 are configured to contract downward in conjunction with the pivoting of the arms 52 when the arms 52 are tilted.

As illustrated in FIG. 2 and FIG. 3, the second cover 20 includes a plurality of structure bodies 21 that overlap with each other. The structure bodies 21 each have a plate-like shape and are slidable relative to each other. The structure body 21 has a main wall 21*a* and a pair of side walls 21*b*. The main wall 21*a* has a rectangular plate-like shape and extends in the second direction Y. The structure body 21 is bent at a right angle between the main wall 21*a* and the side walls 21*b*. The side walls 21*b* are provided at both ends of the structure body 21. The pair of side walls 21*b* face each other in the second direction Y. The side wall 21*b* of each structure body 21 is rotatably supported by the slide body 4 and can be rotated with an axis in the second direction Y as a center of rotation.

The rotation of the motor 53 is transmitted to the second cover 20 via a sprocket and a chain. The second cover 20 includes a rotary member 22 as illustrated in FIG. 3. The rotary member 22 is driven by the motor 53 to rotate. The rotary member 22 is configured to drive and rotate the structure bodies 21 in turn. In a case of erecting the arms 52, the rotary member 22 rotates in conjunction with the pivoting of the arms 52, rotating the structure bodies 21 upward in turn.

The first structure body 21 rotates upward while sliding with the second structure body 21. When the first structure body 21 has risen to a predetermined position, the second structure body 21 begins to rotate. The second structure body 21 rotates upward while sliding with the third structure body 21. When the second structure body 21 has risen to a predetermined position, the third structure body 21 begins to rotate. Thus, the second cover 20 is a telescopic cover that expands in an arc shape as the structure bodies 21 rotate sequentially while sliding.

As illustrated in FIG. 2, the third covers 30 are disposed on both sides of the second direction Y with respect to the connector unit 5. The pair of third covers 30 face each other in the second direction Y with the connector unit 5 placed therebetween. Each third cover 30 has a plurality of structure bodies 31 that overlap with each other. The structure bodies 31 each have a plate-like shape and are slidable relative to each other. The structure body 31 illustrated in the example has a flat plate shape and extends in the first direction X.

The third cover 30 in this embodiment causes a parallel link to move the structure body 31 up and down. An end part 31*a* of each structure body 31 on the rear side X2 is connected to the arm 52. The end part 31*a* may be indirectly connected to the arm 52. The end part 31*a* is connected, for example, to a link 54 parallel to the arm 52. The link 54 is connected to the arm 52 and faces the arm 52 in the second direction Y. An end part 31*b* on the front side is connected to a link 32. The link 32 is rotatably supported by the slide body 4 and is configured to stay parallel to the arm 52. The link 32 may be driven by the motor 53 to rotate in synchronization with the arm 52.

The structure bodies 31 move up and down while being supported by the link 54 and the link 32. In the case of erecting the arms 52, the structure bodies 31 move upward in conjunction with the pivoting of the arms 52. Thus, the third covers 30 extend upward while causing the structure bodies 31 to slide. The third cover 30 is a telescopic cover in which the structure bodies 31 extend upward while rising simultaneously. In a case of tilting the arms 52, the structure bodies 31 move downward in conjunction with the pivoting of the arms 52. This causes the third covers 30 to contract downward.

As illustrated in FIG. 1, the casing 3 includes a fixed cover 7, a slide cover 8, and an auxiliary cover 9. The casing 3 covers the slide body 4 from above and from lateral sides to house the slide body 4. The fixed cover 7 is fixed to the main body 2. The fixed cover 7 is disposed at a part of the main body 2 on the rear side X2. The slide cover 8 is connected to the first cover 10 on the side of the fixed cover 7. In other words, the slide cover 8 is connected to an end part of the first cover 10 on the rear side X2. The slide cover 8 is slidable in the first direction X together with the first cover 10. The first cover 10 is connected to the slide cover 8 via a hinge and pivots while being supported by the slide cover 8.

The auxiliary cover 9 is disposed between the slide cover 8 and the fixed cover 7. For example, the auxiliary cover 9 is disposed between the slide cover 8 and the fixed cover 7 in the first direction X. The auxiliary cover 9 is disposed between the slide cover 8 and the fixed cover 7 in the third direction Z. In other words, the auxiliary cover 9 overlaps with the fixed cover 7 on the outside. The slide cover 8 overlaps with the auxiliary cover 9 on the outside.

As illustrated in FIG. 4, the slide cover 8 and the auxiliary cover 9 are independent of each other and can move relative to each other in the first direction X. A side wall 91 of the auxiliary cover 9 includes a projection 91*a*. The projection 91*a* is disposed on an outer surface of the side wall 91 and extends in the third direction Z. A side wall 81 of the slide cover 8 includes a projection 81*a* that can be in contact with the projection 91*a*. The projection 81*a* is disposed on an inner surface of the side wall 81 that faces the auxiliary cover 9.

The slide cover 8 is connected to the first cover 10 via a connection part 11. The connection part 11 has a hinge or the like, and connects the slide cover 8 and the first cover 10 so that the first cover 10 can pivot relative to the slide cover 8. The connection part 11 is fixed to a top wall 82 of the slide cover 8. The connection part 11 is disposed at an end part of the top wall 82 on the front side X1 and can be in contact with the auxiliary cover 9.

As illustrated in FIG. 5, the slide cover 8 is disposed so as to cover the auxiliary cover 9 from the outside. FIG. 5 illustrates a movable range RX where the auxiliary cover 9 is movable. The movable range RX is the range along the first direction X in which the auxiliary cover 9 can move relative to the slide cover 8. The auxiliary cover 9 can move relative to the slide cover 8 from the position illustrated in FIG. 5 to the position illustrated in FIG. 6. The position of the auxiliary cover 9 illustrated in FIG. 5 is the position where the projections 81*a* and 91*a* are in contact. The position of the auxiliary cover 9 illustrated in FIG. 6 is the position where an end surface of the auxiliary cover 9 on the front side X1 is in contact with the connection part 11.

When the slide cover 8 slides to the front side X1, a part of the auxiliary cover 9 protrudes out of the slide cover 8, as illustrated in FIG. 5. This part of the auxiliary cover 9 protrudes from the slide cover 8 to the rear side X2. Thus, an opening, which is formed at the time of sliding, is covered with the auxiliary cover 9, as described below.

An operation of the vehicle charging system 1 according to the present embodiment is described first. At the start of the charging operation, the vehicle charging system 1 causes the slide body 4 to slide to the front side X1 as illustrated in FIG. 7. At this time, the first cover 10 is locked and stopped. The vehicle charging system 1 unlocks the first cover 10 when the slide body 4 has advanced to a predetermined position. This allows the first cover 10 and the slide cover 8 to slide together with the slide body 4. The posture of the arms 52 illustrated in FIG. 7 is the tilted posture, and the connector unit 5 is housed in the housing space 40 surrounded by the frame part 42. The second cover 20 and the third covers 30 are in a contracted state and are stored inside the frame part 42.

The vehicle charging system 1 causes the sensor to detect the position of the inlet 210 and determines the target position of the slide body 4. The vehicle charging system 1 positions the connector unit 5 relative to the inlet 210 by making the slide body 4 advance or retract to the target position. When the slide body 4 advances and retracts, the first cover 10 and the slide cover 8 advance and retract with the slide body 4.

FIG. 8 illustrates a vehicle charging system 1R according to Comparative Example. The vehicle charging system 1R according to Comparative Example does not include the auxiliary cover 9. In this case, when the first cover 10 and the slide cover 8 have moved to the front side X1 the most, an opening 3*a* is formed between the fixed cover 7 and the slide cover 8.

In the vehicle charging system 1 according to this embodiment, the auxiliary cover 9 covers the opening 3*a* formed between the fixed cover 7 and the slide cover 8, thereby blocking the opening 3*a*, as illustrated in FIG. 9. The auxiliary cover 9 in this embodiment can prevent the entry of foreign matters, etc. into the casing 3.

In the vehicle charging system 1, when the slide body 4 has stopped at the target position, the arms 52 are erected so that the connector 51 faces the inlet 210. As illustrated in FIG. 3, the second cover 20 and the third covers 30 extend upward and form the frame 6 surrounding the erected arms 52. The second cover 20 is located on the front side X1 with respect to the arms 52 and prevents the entry of foreign matters from the front side X1. The third covers 30 are located on both sides of the second direction Y with respect to the arms 52 and prevents the entry of foreign matters from the lateral sides. The first cover 10 is located on the rear side X2 with respect to the arms 52 and prevents the entry of foreign matters from the rear side X2. Thus, the vehicle charging system 1 according to this embodiment includes the covers 10, 20, and 30 that surround the erected arms 52 from four sides.

The vehicle charging system 1 charges the battery of the vehicle 200 by having the connector 51 fitted to the inlet 210. When charging is complete, the connector 51 is removed from the inlet 210 and the arms 52 are tilted in the vehicle charging system 1. The second cover 20 and the third covers 30 contract downward in conjunction with the pivoting of the tilting arms 52 and are stored in the housing space 40. The first cover 10 tilts in conjunction with the pivoting of the arms 52. In the vehicle charging system 1, after the connector unit 5, the second cover 20, and the third covers 30 are housed in the housing space 40, the first cover 10 is locked, the slide body 4 is retracted, and the slide body 4 is housed in the main body 2. When the slide body 4 has retracted to the initial position illustrated in FIG. 1, the charging operation is complete.

The first cover 10 may have side plate parts 12 as illustrated in FIG. 10. The side plate parts 12 cover the arms 52 from the outside in the second direction Y. The side plate part 12 is formed by a plurality of plate members 13. The plate members 13 move upward while sliding relative to each other in conjunction with the pivoting of the arms 52. As illustrated in FIG. 10, the second cover 20 and the side plate parts 12 may be disposed outside in the second direction Y relative to the third covers 30.

As described above, the vehicle charging system 1 according to the present embodiment includes the main body 2, the slide body 4, the connector unit 5, the first cover 10, the second cover 20, and the third covers 30. The main body 2 is fixed to the floor part 100 of the vehicle stop space where the vehicle stops. The slide body 4 is slidable in a first direction X relative to the main body 2. The connector unit 5 includes the connector 51 that is connected to the vehicle, and the arms 52. The base end part 52*a* of the arm 52 is pivotally supported by the slide body 4. The tip end part 52*b* of the arm 52 supports the connector 51.

The first cover 10 covers the connector unit 5 from above with the slide body 4 housed in the main body 2. The first cover 10 covers the arms 52 from the side of the main body 2 while pivoting in conjunction with pivoting of the arms 52 when the arms 52 are erected. The second cover 20 is supported by the slide body 4 and disposed on the side opposite to the side of the main body 2 with respect to the connector unit 5. The third covers 30 are supported by the slide body 4 and disposed on both sides of the connector unit 5 in the second direction Y orthogonal to the first direction X.

When the arms 52 are erected, the second cover 20 and the third covers 30 extend upward in conjunction with the pivoting of the arms 52, thereby forming the frame 6 that surrounds the arms 52. When the vehicle 200 is charged, the housing space 40 that houses the connector unit 5 and the drive mechanism is exposed to the external space. The vehicle charging system 1 according to this embodiment can prevent the entry of foreign matters into the housing space 40 by surrounding the connector unit 5 with the frame 6.

The frame 6 illustrated in the example also surrounds the drive mechanism that drives the connector unit 5. Thus, the frame 6 can protect the drive mechanism such as the motor 53, the sprocket, the chain, and the link mechanism. The frame 6 may surround a motor configured to cause the slide body 4 to slide. The frame 6 may surround a control board that controls the drive mechanism. The frame 6 may surround the sensor that detects the inlet 210.

The second cover 20 and the third covers 30 according to this embodiment respectively include the structure bodies 21 and 31 with a plate shape that overlap with each other. The second cover 20 and the third covers 30 extend upward while causing the structure bodies 21 and 31 to slide in conjunction with the pivoting of the arms 52 when the arms 52 are erected. The second cover 20 and the third covers 30, which include the structure bodies 21 and 31, respectively, become smaller when housed.

The vehicle charging system 1 according to this embodiment includes the casing 3 that houses the slide body 4 while covering the slide body 4 from above and from the lateral sides. The casing 3 includes the fixed cover 7, the slide cover 8, and the auxiliary cover 9. The fixed cover 7 is fixed to the main body 2. The slide cover 8 is connected to the first cover 10 on the side of the fixed cover 7. The slide cover 8 is slidable in the first direction X together with the first cover 10. The auxiliary cover 9 is disposed between the slide cover 8 and the fixed cover 7. The auxiliary cover 9 is configured to cover the opening 3*a* formed between the slide cover 8 and the fixed cover 7 when the slide cover 8 slides in a direction away from the fixed cover 7. Thus, the vehicle charging system 1 according to this embodiment can prevent the entry of foreign matters through the opening 3*a*.

The auxiliary cover 9 in this embodiment is slidable in the first direction X relative to each of the slide cover 8 and the fixed cover 7. The auxiliary cover 9 can be housed in the slide cover 8 when the slide cover 8 is retracted toward the main body 2, as illustrated in FIG. 6. This can enlarge the movable range of the auxiliary cover 9 in the first direction X. For example, the slide cover 8 can be retracted to the rear end of the fixed cover 7.

The contents disclosed in the above embodiment may be combined and implemented as appropriate.

The second cover and the third covers of the vehicle charging system according to the present embodiment extend upward in conjunction with the pivoting of the arm when the arm is erected, thereby forming the frame surrounding the arm. The vehicle charging system according to the present embodiment has the effect of preventing the entry of foreign matters into the housing space that houses the equipment.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle charging system comprising:

a main body fixed to a floor part of a vehicle stop space where a vehicle stops;

a slide body that is slidable in a first direction relative to the main body;

a connector unit including an arm and a connector to be connected to the vehicle to charge, a base end part of the arm being pivotally supported by the slide body and a tip end part of the arm supporting the connector;

a first cover that covers the connector unit from above with the slide body housed in the main body, and covers the arm from a side of the main body while pivoting in conjunction with pivoting of the arm when the arm is erected;

a second cover that is supported by the slide body and disposed on a side opposite to the side of the main body with respect to the connector unit; and third covers that are supported by the slide body and disposed on both sides of the connector unit in a second direction orthogonal to the first direction, wherein when the arm is erected, the second cover and the third covers extend upward in conjunction with the pivoting of the arm, thereby forming a frame that surrounds the arm.

2. The vehicle charging system according to claim 1, wherein the second cover and the third covers each include a plurality of structure bodies with a plate shape that overlap with each other, and extend upward while causing the structure bodies to slide in conjunction with the pivoting of the arm.

3. The vehicle charging system according to claim 1, further comprising:

a casing that houses the slide body while covering the slide body from above and from lateral sides, wherein the casing includes a fixed cover, a slide cover, and an auxiliary cover, the fixed cover is fixed to the main body, the slide cover is connected to the first cover on a side of the fixed cover and is slidable in the first direction together with the first cover, and the auxiliary cover is disposed between the slide cover and the fixed cover and is configured to cover an opening formed between the slide cover and the fixed cover when the slide cover slides in a direction away from the fixed cover.

4. The vehicle charging system according to claim 2, further comprising:

a casing that houses the slide body while covering the slide body from above and from lateral sides, wherein the casing includes a fixed cover, a slide cover, and an auxiliary cover, the fixed cover is fixed to the main body, the slide cover is connected to the first cover on a side of the fixed cover and is slidable in the first direction together with the first cover, and the auxiliary cover is disposed between the slide cover and the fixed cover and is configured to cover an opening formed between the slide cover and the fixed cover when the slide cover slides in a direction away from the fixed cover.

5. The vehicle charging system according to claim 3, wherein the auxiliary cover is slidable in the first direction relative to each of the slide cover and the fixed cover.

6. The vehicle charging system according to claim 4, wherein the auxiliary cover is slidable in the first direction relative to each of the slide cover and the fixed cover.

* * * * *